Nov. 11, 1941.   A. F. LAMBRECHT ET AL   2,262,104
VEGETABLE DISPLAY RACK
Filed Feb. 29, 1940   2 Sheets-Sheet 2
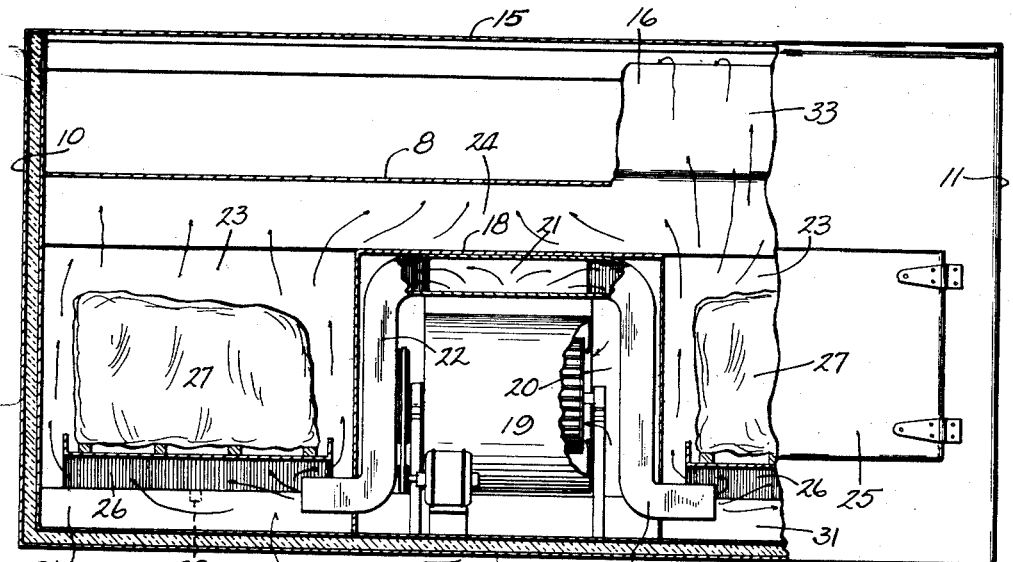
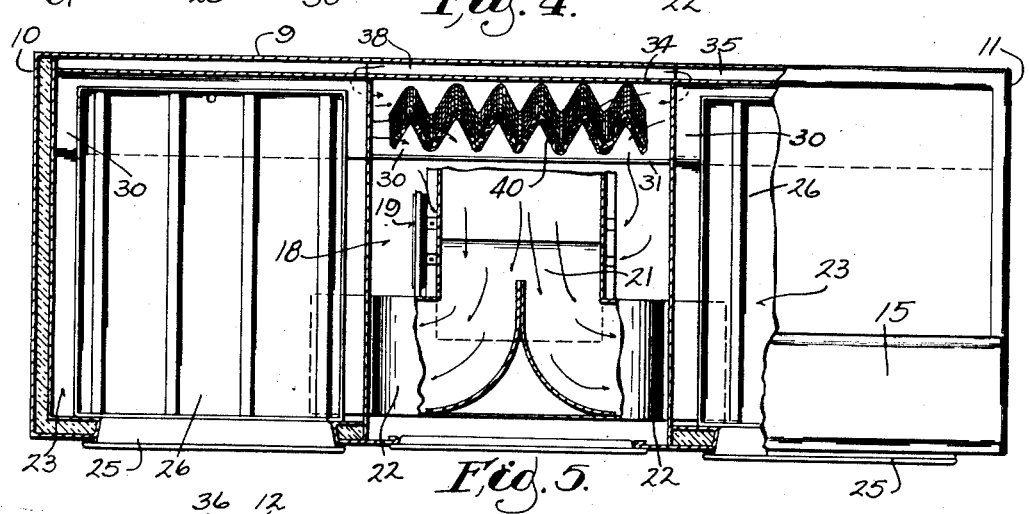
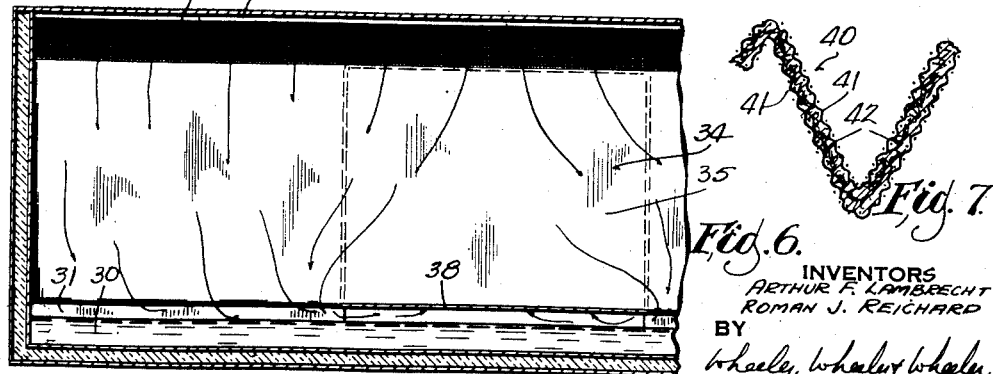
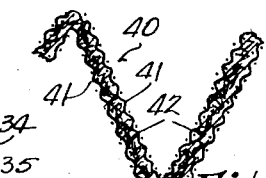
INVENTORS
ARTHUR F. LAMBRECHT
ROMAN J. REICHARD
BY
Wheeler, Wheeler Wheeler
ATTORNEYS Patented Nov. 11, 1941

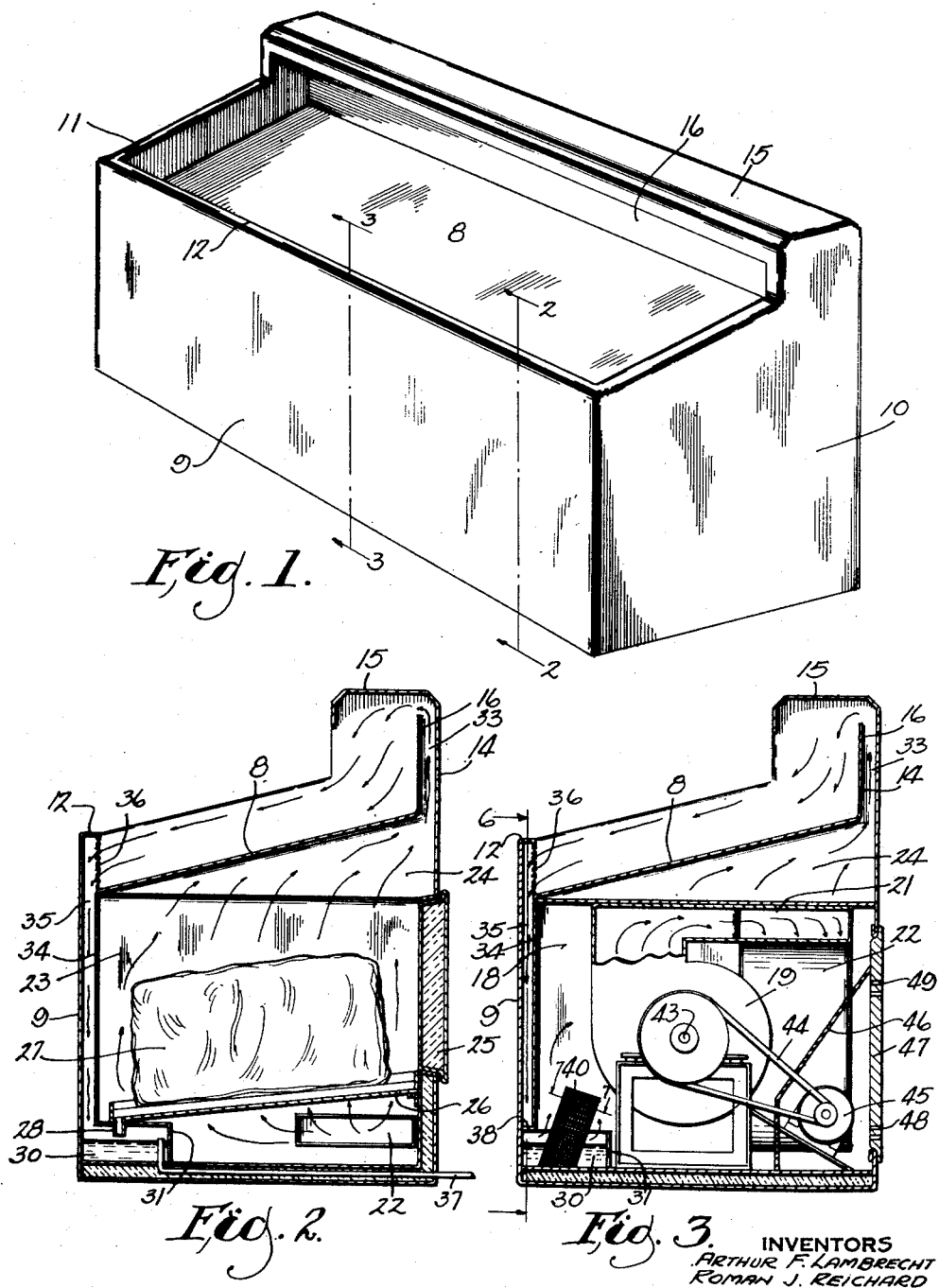

2,262,104

UNITED STATES PATENT OFFICE 2,262,104

VEGETABLE DISPLAY RACK

Arthur F. Lambrecht and Roman J. Reichard, Milwaukee, Wis.

Application February 29, 1940, Serial No. 321,460

7 Claims. (Cl. 62—37)

This invention relates to improvements in vegetable display racks.

It is the primary object of the present invention to provide a rack on which vegetables can be displayed for substantial periods without undue depreciation and without requiring sprays of water or the like to keep them fresh. There are many vegetable products to which a water spray is detrimental and in no instance is such a spray as satisfactory from the standpoint of preservation as is proper refrigeration and such humidification as is beneficial.

It is therefore an important object of the invention to provide means whereby refrigerated air may be recirculated over an inclined rack on which vegetables are displayed for sale in a manner such that there will be substantially no commingling of the refrigerated air with the air of the room in which the device is located, despite the fact that the vegetables are fully exposed and the rack is fully open.

It is a further object of the invention to provide for humidification of the air at the warmest point in its cycle of recirculation, the humidification preferably being accomplished without requiring any pipe connections to an extraneous water supply.

It is a further object of the invention to provide not merely for the recirculation of chilled air over the vegetables, but further for the chilling of the surface on which the vegetables rest, thereby not only preventing heat radiation from such surface but also preventing the establishment of rising currents of air from such surface which might result in commingling the refrigerated air with the air of the room.

Other objects have to do with the specific organization of the device as will appear more fully from the following disclosure.

In the drawings:

Fig. 1 is a view in perspective showing a completed vegetable display rack embodying this invention.

Fig. 2 is a view of the rack taken in transverse section on the line 2—2 of Fig. 1.

Fig. 3 is a view of the rack taken in transverse section on the line 3—3 of Fig. 1.

Fig. 4 is a view of the rack partially in rear elevation and partially as it appears with the rear wall broken away to expose the interior mechanism.

Fig. 5 is a view of the device as it appears partially in plan and partially with the top of the rack broken away to expose the interior mechanism.

Fig. 6 is a fragmentary view taken on the line 6—6 of Fig. 3.

Fig. 7 is a fragmentary detail on an enlarged scale taken in the section indicated at 7—7 in Fig. 3.

Like parts are identified by the same reference characters throughout the several views.

The cabinet shown in Fig. 1 provides a tray or rack surface at 8 which is preferably inclined in the usual manner in order to display vegetables and fruits to the best advantage. The front wall 9 and the end walls 10 and 11 are finished with flanges 12 overhanging the display tray at 8. The rear wall 14 of the cabinet is provided with a canopy 15 of substantial depth which overhangs the rear surface of the display tray 8, and an upwardly extending partition 16 which extends vertically from the rear margin of the tray.

Beneath the tray the cabinet is divided into compartments. There is a central box-like compartment at 18 which comprises a fan chamber. The fan casing 19 is located within chamber 18 and preferably contains a Sirocco type fan 20 receiving air through openings in the casing at the ends of the fan rotor. The fan discharge comprises a divided conduit 21 having branches 22 leading in opposite directions into refrigerating compartments 23, these refrigerating compartments being in direct, constant, free communication with each other through the space 24 which lies beneath the inclined display tray or rack 8 and is continuous from one end of the cabinet to the other over the top of the fan chamber 18.

Doors at 25 give access to the respective ice compartments and permit the ice to be readily introduced on to suitable drainage shelves 26. These shelves are preferably inclined forwardly to deliver the drip from the ice cakes 27 through small drain pipes 28 into the humidifying pan 30 which extends continuously along the front of the cabinet and is partitioned by wall 31 from the ice compartments 23 and the fan compartment 18.

The air delivered by the fan through the branch conduits 22 is preferably discharged into the ice compartments 23 beneath the drainage shelves 26 on which the ice cakes 27 are carried. The air rises upwardly about the ice cakes, becoming refrigerated thereby and passes into intimate contact with the under surface of the vegetable tray or rack 8 and thence through the space 24 to a vertical passage 33 which is continuous throughout the whole length of the rear wall 14 of the cabinet and is defined by the rear wall 14 and partition 16 and leads to the under surface of the canopy 15.

The canopy directs downwardly over the vegetables or fruit on the tray 8 the refrigerated air which emerges from the passage 33. The air has no excessive velocity nor is there any substantial irregularity in its delivery. Its velocity is reduced and eddy currents are eliminated in the relatively large capacity of the space 24 beneath the tray and the vertical passage 33 is so elongated as to deliver the air from beneath the hood substantially in the form of a uniform sheet which, by reason of its low temperature and the form of the structure, tends to settle with a minimum of disturbance on to the inclined tray surface 8 and to flow smoothly across the tray surface and the vegetables or fruits thereon displayed.

It is extremely noteworthy that the tray surface 8 is bounded at the ends and front of the cabinet by wall flanges of uniform height above the tray. At the front of the cabinet, between the front wall 9 thereof and partition 34 which is continuous across the front of the ice compartments 23 and the fan chamber 18, there is a passage 35 open for the full length of the cabinet and having a cross section comparable to that of passage 33 through which the air is supplied. A screen 36 prevents vegetable material from finding access into the air return passage 35 but there is little or no obstruction to the flow of air into that passage. At its lower end the passage 35 communicates with the humidifying pan 30 above the lever at which water is maintained therein by the drain 37. As above noted, this humidifying pan is likewise extended the full length of the cabinet.

Whereas the pan is covered to isolate the return flow of air from the ice compartments 23 as shown in Fig. 2, the pan is uncovered where it passes through the fan compartment 18. However, at points in registry with the fan compartment 18 the lower end of the return passage 35 is closed by a partition 38 shown in Fig. 3. As a result of this arrangement the air is forced to enter the humidifying pan at its ends and to leave the humidifying pan at its center, passing therefrom directly into the fan chamber. To facilitate humidification at this point a wick 40 is preferably set into the pan in the manner shown in Fig. 3 and Fig. 5. This wick preferably comprises outer plies 41 of screen cloth or the like with cotton cloth or other fibrous material 42 positioned therebetween, the whole multi-ply wick being then convoluted as best shown in Figs. 5 and 7.

The fan in fan casing 19 is mounted on a shaft 43 which may conveniently be driven by a belt 44 from the motor 45 in the manner indicated in Fig. 3. To prevent the motor heat from contributing to the melting of the ice cakes at 27 the motor may, if desired, be located in a compartment of its own defined by a partition 46 and accessible through a rear door 47 which may be provided with vent openings at 48 and 49 for air circulation to dissipate the heat of the motor externally of the cabinet.

We are aware of the fact that it has heretofore been proposed to circulate refrigerated air over vegetables exposed on an open tray or rack. As distinguished from other devices for this purpose our apparatus successfully recirculates the same air with little or no commingling of the circulating air with that of the outside atmosphere. The uniform height of the end and front walls surrounding the display surface, together with the manner in which the air is delivered to and removed from that surface, are believed to be important factors contributing to this result. Tests with small flames show rapid movement of air currents below the level of the flange 12 with no disturbance whatever of the air lying immediately above the plane of such flange. The resistance to air movement toward the intake of the fan is substantially the same as the resistance to air movement from the discharge of the fan and consequently the fan tends to draw exactly the same amount of air through the screen at 36 as it delivers through passage 33 on to the surface of the display tray. Here also, is a factor which tends to prevent the introduction of any outside air for commingling with the air which has been refrigerated.

Once the display tray and the fruits or vegetables thereon have been cooled, the consumption of ice in the continued operation of the apparatus is very slight indeed, due primarily to the fact that the same refrigerated air is recirculated over and over again. The dehydration of the vegetables and fruits on display is prevented by humidification of the air. Such humidification is most efficiently done at the point of the cycle where the air is the warmest and also where it is subject to partial vacuum rather than to pressure. That is to say the air is humidified on its way to the fan after passing over the material which has been cooled. After being saturated or substantially saturated by passing through the humidifying tray and over the wick surfaces at 40, the air gives off some of its humidity in passing over the ice but remains substantially saturated at its reduced temperature when it is redelivered over the material on the tray, whereby dehydration of such material is avoided.

It will be apparent to those skilled in the art that artificial refrigeration might be substituted for the use of natural ice, but where natural ice is used the drainage from the ice keeps the humidification trough 30 supplied with water and this eliminates a water supply connection to that trough. Consequently the only connections required for the apparatus are those involved in supplying the low powered motor at 45 which drives the circulating fan and the drain connection at 37.

We claim:

1. In a device of the character described, the combination with a cabinet having an unapertured display surface inclined downwardly from back to front, of a front wall adjoining the lower margin of said display surface, means at the inside of the front wall providing an air return passage opening into said wall from said surface, means for supplying air to said surface adjacent its high rear margin, means at the ends of said surface for confining to said surface the air supplied thereto, means beneath said surface for recirculating to said air supply means the air received into said return passage, and means for refrigerating the recirculated air.

2. In a device of the character described, the combination with a substantially continuous and smoothly inclined tray, of a cabinet having a front wall rising above the lower margin of said tray and provided with a return passage opening into said wall directly from the face of said tray, said cabinet having end walls with their upper margins commencing at the front wall and upwardly inclined in the general direction of inclination of the tray and at a substantially uniform height thereabove and a rear wall comprising a canopy overhanging the higher margin of the tray and provided with a delivery passage arranged to discharge air across the tray in the direction of its lower margin and said return passage, air circulating means within the cabinet and spaced below the tray and connected to draw air through said return passage, air refrigerating means within the cabinet in the path of air delivered from said circulating means, the space within said cabinet immediately beneath said tray being in communication with said refrigerating means and with said delivery passage and constituting a chamber within which the flow of air is equalized and the tray is cooled from beneath.

3. In a device of the character described, the combination with a cabinet provided with an upwardly exposed tray and walls surrounding the tray, two of said walls opposing each other being provided respectively with delivery and return passages for air, the return passage opening directly from the face of the tray, a fan chamber positioned centrally beneath the tray and communicating with said return passage, a fan casing within said chamber provided with inlet openings from said chamber and having discharge conduit means leading from said fan chamber to portions of the cabinet on opposite sides of the fan chamber, refrigerating means in said last mentioned cabinet portions adapted to chill air delivered thereto through said conduit means, said last mentioned cabinet portions being in free communication with the under surface of the tray and also communicating with said delivery passage whereby the refrigerated air circulated from said fan casing over said refrigerating means passes in contact with the under surface of the tray through said delivery passage to the exposed upper surface of the tray and thence to said return passage, and means in said casing for recirculating such air.

4. In a device of the character described, the combination with a display tray having its upper surface exposed, of a cabinet having wall portions surrounding said tray and defining an air stream of substantially constant depth thereover, said tray being elongated and the upwardly projecting wall portions at the longer sides of the tray being provided respectively with inlet and return passages whereof the return passage opens directly from the face of the tray, a humidifying pan with which said return passage communicates, a fan chamber disposed within the cabinet intermediate the ends thereof and communicating with said pan to receive air therethrough from said return passage, said cabinet being provided with at least one natural ice chamber having a drainage connection to said pan for replenishment of the supply of water therein and otherwise isolated from the return flow of air toward said fan chamber, a fan in said chamber provided with a discharge conduit leading to said natural ice chamber for the delivery of humidified air over ice in said chamber, and means providing communication from said natural ice chamber to said delivery passage whereby refrigerated humidified air is delivered over the surface of said tray for recirculation through said return passage.

5. In a device of the character described, the combination with a cabinet having an inclined top wall constituting a display tray, of a fan chamber centrally disposed within said cabinet and spaced below said top wall whereby to provide compartments at each side of the fan chamber in free communication with each other and with the under surface of said tray above said fan chamber, said cabinet including a hollow front wall having a return passage opening directly from the face of the tray along its lower margin and a hollow rear wall comprising a delivery passage opening to the face of the tray from the space immediately beneath the tray, said return passage in the hollow front wall communicating with the interior of the fan chamber and said fan chamber communicating with said compartments and being provided with air circulating means for drawing air from the surface of the tray through the return passage and delivering such air through said compartments and said delivery passage back to the surface of the tray.

6. In a device of the character described, the combination with an inclined tray, of a cabinet having end walls rising above the ends of the tray, a rear wall rising above the higher side of the tray and a front wall rising above the lower side of the tray, said front wall having a return air passage opening substantially directly from the surface of the lower margin of the tray, of a humidifying pan having its ends communicating with said return passage, a fan chamber disposed centrally within the cabinet and spaced beneath the tray and communicating centrally with said pan to receive therefrom air which has passed through said pan from the ends thereof, means for supplying water to said pan for the humidification of return air, a fan in said fan chamber, said fan chamber being provided with delivery means opening to portions of said cabinet at each side of said fan chamber in the opposite ends of said cabinet, refrigerating means in said last mentioned cabinet portions in the path of air delivered by the fan thereto, said refrigerating means comprising drains opening to said humidifying pan and means providing a delivery passage opening from said cabinet portions and communicating freely therewith beneath said tray and leading to the upper surface of the tray near the top rear edge thereof.

7. In a device of the character described, the combination with a substantially continuous and smoothly inclined tray, of a cabinet having a front wall rising above the lower margin of said tray and provided with a return passage opening into said wall directly from the face of said tray, said cabinet having end walls with their upper margins commencing at the front wall and upwardly inclined in the general direction of inclination of the tray and at a substantially uniform height thereabove, and a rear wall comprising a canopy overhanging the higher margin of the tray and provided with a delivery passage arranged to discharge air across the tray in the direction of its lower margin and said return passage, air circulating means within the cabinet and spaced below the tray and connected to draw air through said return passage, air refrigerating means within the cabinet in the path of air delivered from said circulating means.

ROMAN J. REICHARD.
ARTHUR F. LAMBRECHT.